US 8,156,297 B2

(12) United States Patent
Geiger et al.

(10) Patent No.: US 8,156,297 B2
(45) Date of Patent: Apr. 10, 2012

(54) SMART DEVICE RECORDATION

(75) Inventors: Avi R. Geiger, Seattle, WA (US);
Michael Fortin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 12/103,316

(22) Filed: Apr. 15, 2008

(65) Prior Publication Data
US 2009/0259802 A1   Oct. 15, 2009

(51) Int. Cl.
*G06F 12/00* (2006.01)

(52) U.S. Cl. ........................................ 711/163; 711/103

(58) Field of Classification Search .................. 711/163, 711/103
See application file for complete search history.

(56) References Cited

U.S. PATENT DOCUMENTS

| 5,426,763 | A |   | 6/1995  | Okada         |         |
|-----------|---|---|---------|---------------|---------|
| 5,611,050 | A | * | 3/1997  | Theimer et al.| 709/202 |
| 5,809,517 | A |   | 9/1998  | Shimura       |         |
| 5,881,002 | A | * | 3/1999  | Hamakawa      | 365/195 |
| 5,978,860 | A |   | 11/1999 | Chan et al.   |         |
| 6,279,069 | B1|   | 8/2001  | Robinson et al.|        |
| 6,622,243 | B1|   | 9/2003  | Christeson    |         |
| 6,714,993 | B1|   | 3/2004  | Bhaskaran     |         |
| 2003/0115415 | A1 |  | 6/2003 | Want et al.  |         |
| 2005/0065961 | A1 | * | 3/2005 | Aguren       | 707/102 |
| 2005/0120175 | A1 | * | 6/2005 | Shimada et al.| 711/114 |
| 2006/0271758 | A1 | * | 11/2006 | Innan et al.| 711/170 |
| 2007/0016750 | A1 | * | 1/2007 | Suzuki       | 711/170 |
| 2007/0143823 | A1 |  | 6/2007 | Olsen et al. |         |
| 2007/0245068 | A1 | * | 10/2007 | Yero        | 711/103 |
| 2008/0201331 | A1 | * | 8/2008 | Eriksen et al.| 707/10 |
| 2009/0182965 | A1 | * | 7/2009 | Norman       | 711/163 |

FOREIGN PATENT DOCUMENTS

WO    WO2007099012 A1    9/2007

OTHER PUBLICATIONS

Altiris Removable Storage Security Solution™ 6.0 Product Guide http://www.altiris.com/upload/removablestoragesecurity.pdf. Last accessed Oct. 26, 2007, 23 pages.
Novell ZENworks Endpoint Security Management USB and Removable Media Security http://www.novell.com/products/zenworks/endpointsecuritymanagement/usb_security.html. Last accessed Oct. 26, 2007, 2 pages.
Removable storage, Oct. 18, 2005. http://searchwindowssecurity.techtarget.com/generic/0,295582,sid45_gci1134822,00.html. Last accessed Oct. 26, 2007, 2 pages.

* cited by examiner

*Primary Examiner* — Hashem Farrokh
(74) *Attorney, Agent, or Firm* — Lee & Hayes, PLLC

(57) ABSTRACT

Valuable information can be retained upon a storage device, such as a flash memory unit. Due to the portable nature of the memory, there can be increased likelihood of theft, less back up of important files not a reliable medium, legal physical transfer of the device between parties, and the like. When an operation is requested to take place related to the device, a check can take place if the operation should be allowed based upon device metadata, such as physical location of the device, device history, and so forth. A determination can be made on if the operation should automatically occur based upon a result of the check. If it is determination that the operation should not automatically occur, then the operation can be denied or a request can be made to an owner of the device on if the operation should be allowed to occur.

19 Claims, 10 Drawing Sheets

SMART DEVICE RECORDATION

TECHNICAL FIELD

The subject specification relates generally to storage upon a memory unit and in particular to using intelligent aspects to facilitate data communication.

BACKGROUND

A computer system can use various forms of memory to retain different types of information where memory is often selected for storage based on performance characteristics. Non-volatile memory is a form of storage that retains information without a long-term supply of power, thus information can be retained with a relative cheap cost over a long period. Conversely, volatile memory requires a constant source of power to retain data. However, volatile memory can have other benefits to counter instability, such as quicker access times.

Flash memory is a form of non-volatile memory that can be used to save information in a relatively stable and cost-effective manner. This type of memory is often employed in a variety of consumer electronic devices such as memory cards, universal serial bus (USB), flash drives, personal data assistants (PDAs), digital audio players, digital cameras, mobile phones, and so forth. These portable devices oftentimes communicate with other devices to share information, functionality, and the like. For instance, a user can employ a digital camera to take photographs while the user is on vacation. When the user returns home, she can connect the camera with her computer and transfer a copy of the photographs to her computer hard drive.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Conventionally, memory units can integrate with other devices or systems to communicate information. For example, a user can have a portable flash memory unit attached to her keychain storing various types of information. With the unit being portable, there is very little security relating to protecting the unit. The memory unit can easily be stolen due to size, portability, etc., and a user can perform accidental operations, such as transferring a confidential file to a non-secure device.

The disclosed innovation adds security to a memory unit. An analysis can take place of metadata related to an operation request, such as comparing a location of a unit owner against a location of the unit. Based upon the analysis, a determination can be made on if the requested operation should be automatically allowed and if there is a positive response, then the operation can be permitted. However, if a negative determination is made, then various scenarios can occur. According to one embodiment, a negative determination can render an automatic operation refusal. In a different scenario, an owner and/or operator can be requested to confirm that the operation should take place.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
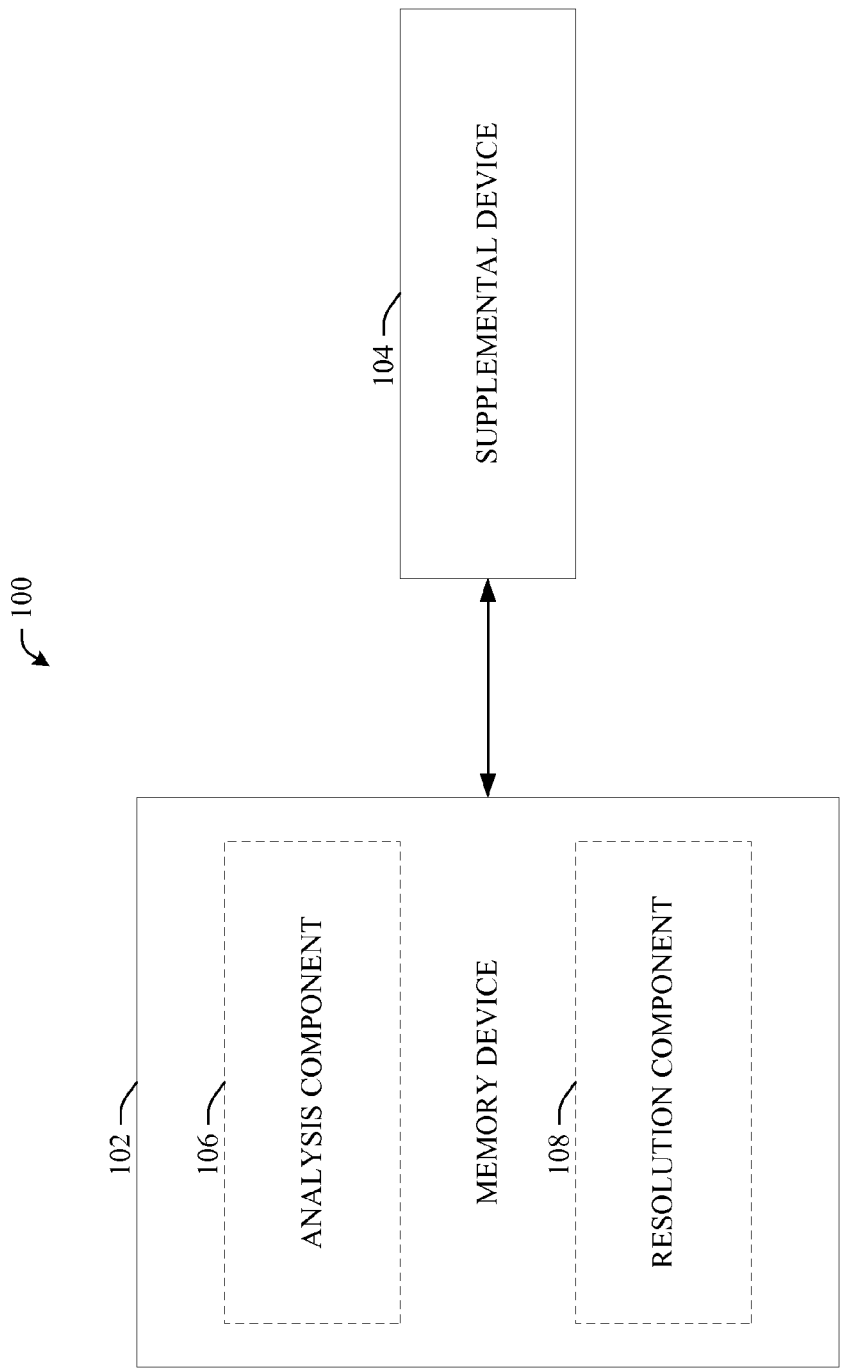
FIG. 1 illustrates a representative memory operation check system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers.

As another example, an interface can include I/O components as well as associated processor, application, and/or API components.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. It is to be appreciated that determinations or inferences referenced throughout the subject specification can be practiced through use of artificial intelligence techniques.

Now referring to FIG. 1, an example system 100 is disclosed for determining if an operation should occur upon a memory device. The memory device 102 can implement as flash memory; however, other memory types can be used. A request can be made for an operation to be performed with regard to the memory device 102, commonly originating from a user or an automated program. Example operations can include coupling the memory device 102 to a supplemental device 104, accessing data upon the memory device 102, or overriding data retained upon the memory device 102. Overriding can include replacing one set of information with different information and/or erasing information.

The memory device 102 can obtain a command to perform an operation, metadata can be gathered from various sources that relates to the device 102, and an analysis component 106 can evaluates metadata related to an operation requested to be performed upon the device 102. Example evaluation can include comparison, mathematical algorithms, predictions, modeling, historical perspective, and the like. The metadata can include environmental information such as physical location of the device 102, contextual information such as language used to make a request, historical information such as previous operation, temporal information such as a time of a request, or a combination thereof A resolution component 108 can intelligently establish (e.g., through artificial intelligence techniques, a rule set, and the like) if the operation should automatically occur as a function of the evaluation. For instance, the memory device 102 can collect metadata that includes a location of the device and a location of a device owner. A request can be made to access a file on the memory device 102 and the analysis component 106 can determine that the device 102 is located in Seattle, Wash. while the user is located in Cleveland, Ohio. An inference can be drawn by the analysis component 106 that the owner and device 102 are in separate locations. The resolution component 108 can conclude that since the device and owner are in different locations, there is a relatively high likelihood of theft and the operation should not automatically occur.

In one configuration, the analysis component 106 and/or the resolution component 108 can reside upon the memory device 102, including when the device implements as flash memory. Moreover, the memory device 102 can be self-contained (e.g., a unit that can be integrated and removed from a computer system, such as through communication through a universal serial bus) as well as integrated with another unit, such as a cellular telephone. Additionally, the memory device 102 when self contained can be portable, such that it can connect from one computer system to another.

Figure 2:
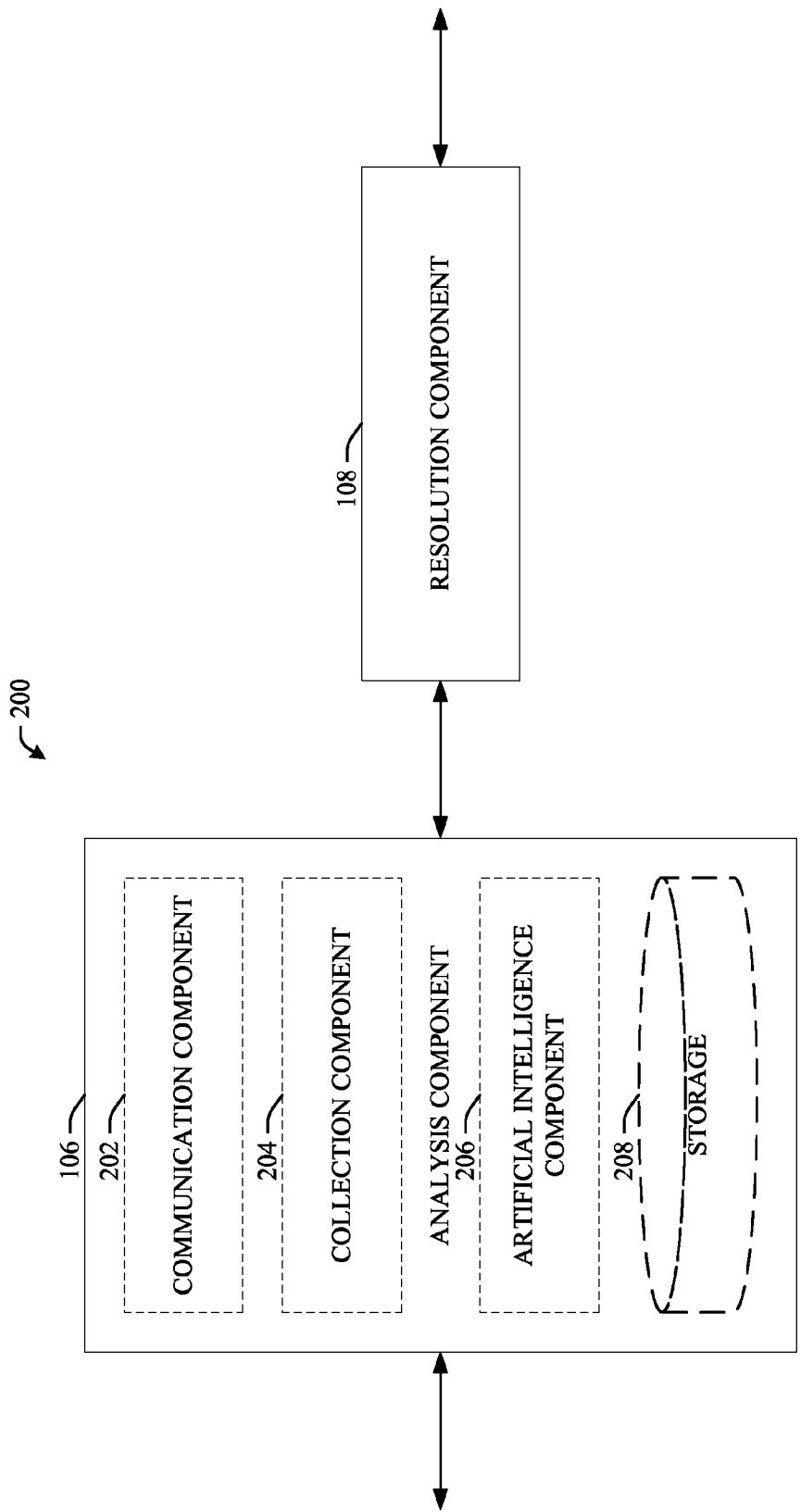
FIG. 2 illustrates a representative memory operation check system with a detailed analysis component in accordance with an aspect of the subject specification.

Now referring to FIG. 2, an example system 200 is disclosed for regulating operation upon a memory device with a detailed analysis component 106. The analysis component 106 evaluates metadata related to a request for an operation upon the portable device. To facilitate operation, the analysis component 106 can use a communication component 202 that can engage with other devices to transfer information, such as to send a request for metadata, receiving metadata from an auxiliary source, etc. Operation can take place wirelessly, in a hard-wired manner, employment of security technology (e.g., encryption), etc. Additionally, metadata transfer can be active (e.g., query/response) or passive (e.g., monitoring of public communication signals). Moreover, the communication component 202 can use various protective features, such as performing a virus scan on collected metadata and blocking metadata that is positive for a virus.

In addition, a collection component 204 can use the communication component 202 to gather a request for an operation as well as metadata related to the request. For instance, a request can be made that information be accessed that is retained upon the memory device and the collection component 204 can gather the request. The request can be processed and the collection component 204 can attempt to locate and extract metadata related to the request. According to one embodiment, the analysis component 106 retains a list of secure and/or reliable metadata sources, such as a global positioning component part of the storage device, and the collection component 204 can use the list to gather data efficiently.

An artificial intelligence component 206 can be used that makes at least one inference or at least one determination with regard to metadata evaluation or establishment if the operation should automatically occur. An example determination can be made that a user is physically separated from a device through geographical modeling. As an illustrative instance, an inference can be made that a user could be accidentally making an incorrect request, such as overriding an important file.

The artificial intelligence component 206 can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, the artificial intelligence component 206 can also include methods for capture of logical relationships such as theorem provers or more heuristic rule-based expert systems. The artificial intelligence component 206 can be represented as an externally pluggable component, in some cases designed by a disparate (third) party.

Different pieces of information, such as collected metadata, component operating instructions (e.g., communication component 202), source location, components themselves, etc. can be held on storage 208. Storage 208 can arrange in a number of different configurations, including as random access memory, battery-backed memory, hard disk, magnetic tape, etc. Various features can be implemented upon storage 208, such as compression and automatic back up (e.g., use of a Redundant Array of Independent Drives configuration). In addition, storage 208 can operate as memory that can be operatively coupled to a processor (not shown) and can implement as a different memory form than an operational memory form. The system 200 can include a resolution component 108 that intelligently establishes if the operation should automatically occur as a function of the evaluation.

Figure 3:
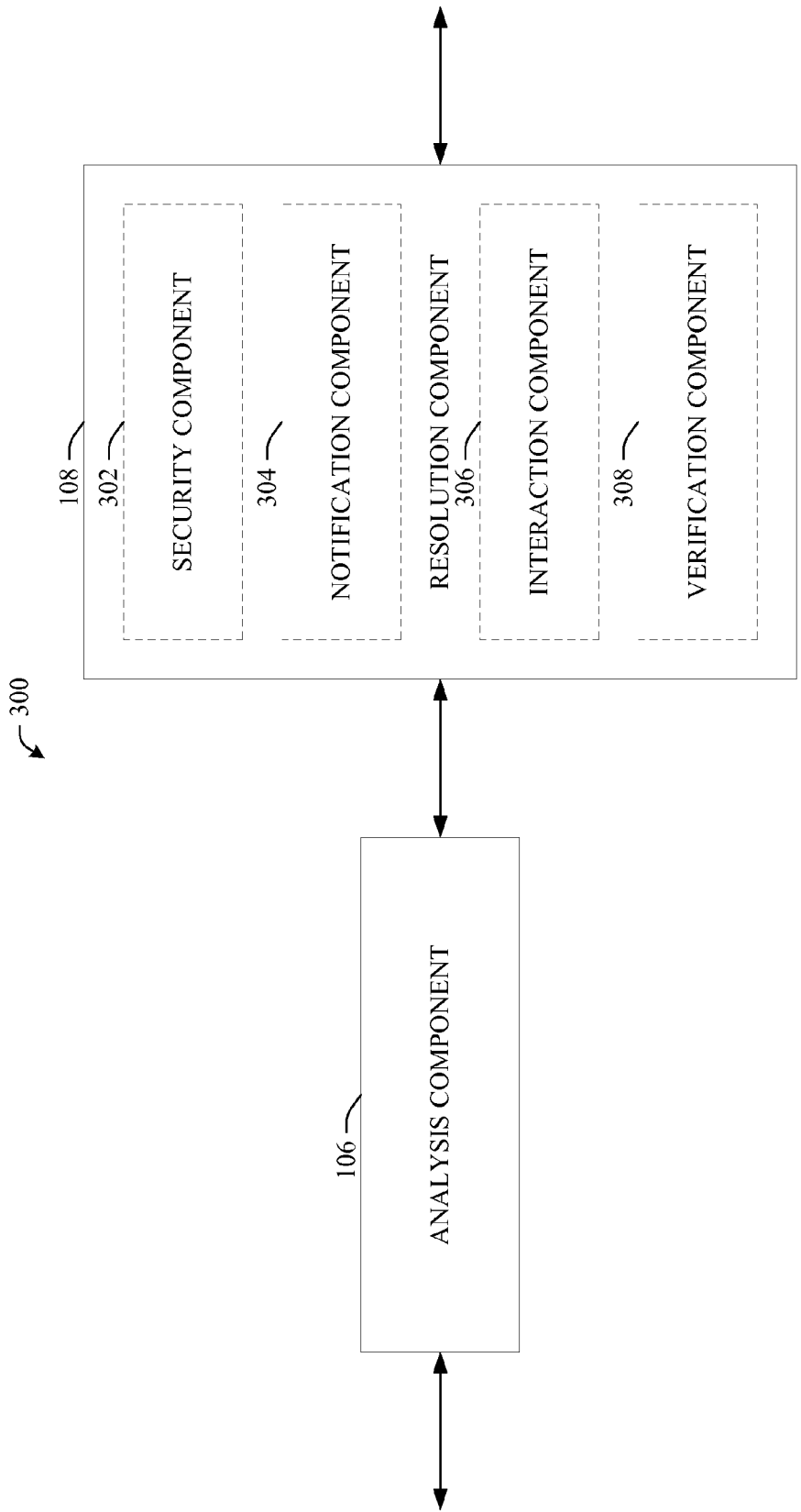
FIG. 3 illustrates a representative memory operation check system with a detailed resolution component in accordance with an aspect of the subject specification.

Now referring to FIG. 3, an example system 300 is disclosed for regulating operation upon a memory device with a detailed resolution component 108. A request to perform an operation upon a memory device can be retrieved and an analysis component 106 can evaluate metadata related to the operation requested to be performed upon the memory device. A resolution component 108 can intelligently establish if the operation should automatically occur as a function of the evaluation.

A security component 302 can facilitate the resolution component 108 to intelligently establish if the operation should automatically occur as a function of security—e.g., if an operation is trusted, if there is a risk the portable device is stolen, etc. For example, the security component 302 can determine if a requesting entity is authorized to perform an operation upon the storage device. If it is established that the operations should not automatically occur, then the operation can be automatically denied. According to one embodiment, a user can request to delete a file that other files rely upon. The security component 302 can identify that there is a relatively high likelihood that the user does not want to delete the file accidentally and an automatic denial can ensue.

In one configuration, denial can be absolute or only change when specific override actions take place such as altering component operation. However, in a different configuration, more information can be gathered if an operation should ultimately be allowed. A notification component 304 can emit a notice to an entity that the operation should not automatically occur when it is established that the operations should not automatically occur. The notice can transfer to a requesting entity, to an owner of the device, and the like. The notice can be static such that a response cannot be easily provided, or dynamic such as requesting a user to confirm denial or authorize the operation.

As part of the notice, a request can be included that an entity confirms status of the operation. An interaction component 306 can request confirmation on if the operation should occur when it is established that the operations should not automatically occur and process a response to the request, the response allows the operation, denies the request, or makes a petition for more information. This differs from conventional operation where a user is always asked to confirm in that there is selection on if user confirmation should be gathered based upon contextual details, such as previous history.

Since security is a concern, it is possible that a false entity can provide information. For example, a malicious entity can intercept the notice with the request and provide a false allowance. A verification component 308 can be employed that authenticates a source of the response. For example, a check can take place if an entity sending authorization has an Internet Protocol (IP) address that matches an IP address on an approved list.

Figure 4:
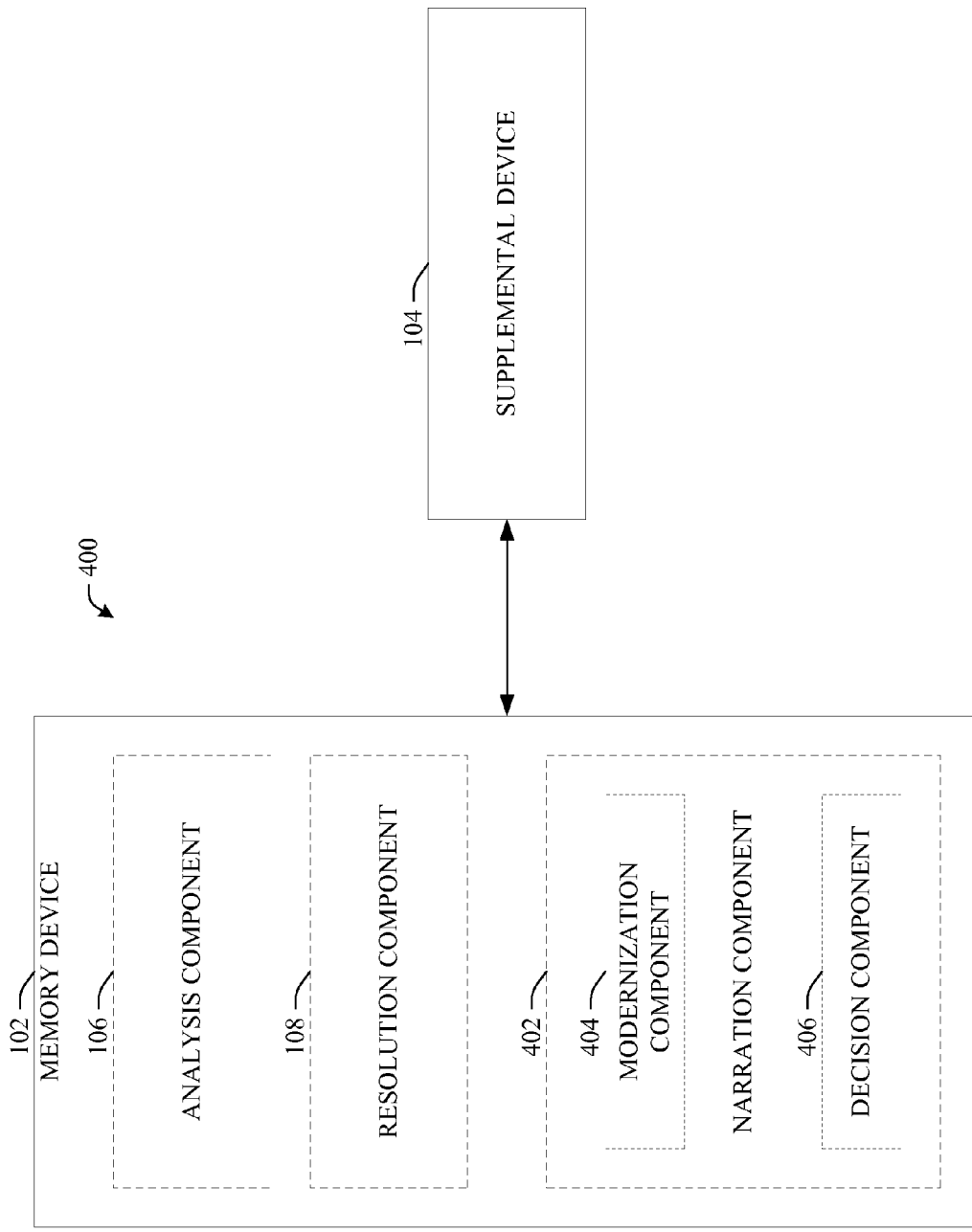
FIG. 4 illustrates a representative memory operation check system that can implement to record operation of memory in accordance with an aspect of the subject specification.

Now referring to FIG. 4, an example system 400 is disclosed showing an historical update configuration that allows previous uses of a memory device 102 to be tracked. A request to implement an operation upon the memory device 102 can be obtained and an analysis component 106 can evaluate metadata related to the operation requested to be performed upon the memory device. A resolution component 108 can establish (e.g., intelligently establish) if the operation should automatically occur as a function of the evaluation.

Historical use of the memory device 102 can be taken into account in determining if an operation should be automatically allowed. A narration component 402 can retain history of operation for the memory device 102, the history can be used to establish if the operation should automatically occur. In one implementation, the history can be retained as a log held on storage 208 of FIG. 2. The history can include not only operational history, but also other historical data. For instance, if an owner of the memory device 102 historically lends the device to certain parties, then the narration component 402 can retain the history and an inference can be drawn that the certain parties are authorized users and operations from those certain parties should be more likely to be automatically allowed.

As new actions take place concerning the memory device 102, updates can occur with regard to historical data. A modernization component 404 can that update the retained history as new information is gathered. Updates can include adding new information as information becomes available, replacing out-of-date information, modifying existing information to create a more accurate representation, and so forth.

It is possible that so much information is collected, that is can become burdensome to retain. Therefore, a decision component 406 can conclude if newly gathered information should be used to update the retained history, the retained history is updated based upon the newly gathered information with a positive conclusion and the newly gathered information is disregarded with a negative conclusion. The conclusion can be based upon a balance between importance of information, available space, ware on the device 102, power consumption of the device 102, and the like.

In an illustrative example of a particular embodiment, if an owner of the memory device 102 lives in Miami, Fla. and rarely leaves the state and a read operation is detected upon the device 102 in Chicago, then an inference can be drawn that the device 102 was stolen and the operation should not automatically occur. The owner can be notified of the operation and a response can be solicited. If an authorized user is making the request, then the owner can respond that the action is allowable and the operation can be permitted. The narration component 402 can update a record stating that a new user is permitted to perform at least some operations upon the device 102, the device can be used in Chicago, and so forth—operation of the system 500 can alter in view of the updated record.

Figure 5:
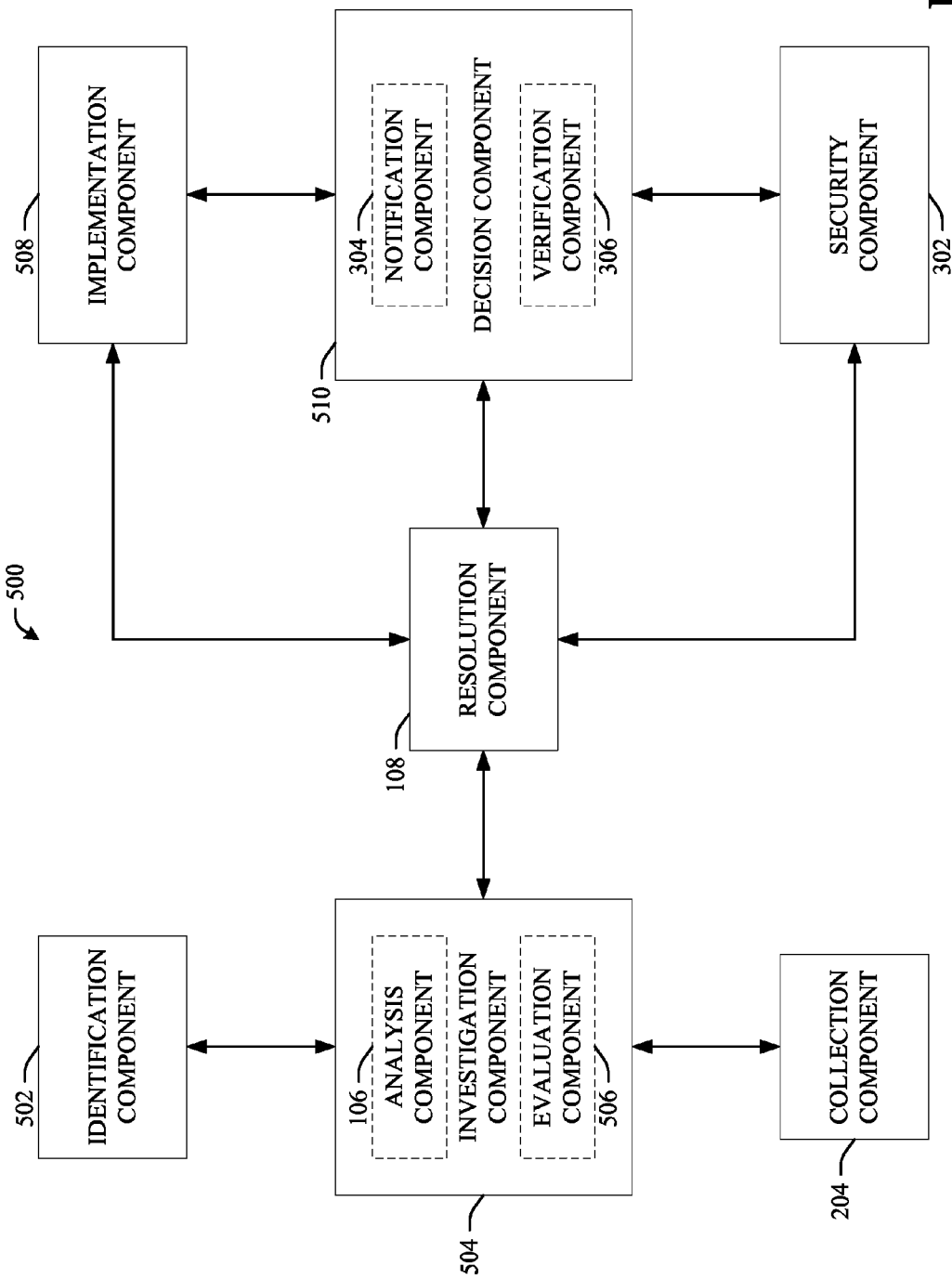
FIG. 5 illustrates a representative system that makes a determination if an operation should occur in relation to a memory unit in accordance with an aspect of the subject specification.

Now referring to FIG. 5, an example system 500 is disclosed for regulating operation upon a memory device. A request to perform can be discovered by an identification component 502, commonly gathered as a direct submission to the system 500 from a requiring unit. However, there operation can originate from other sources, such as a periodic deletion of information that has not been accessed in a certain amount of time from a timing circuit. The identification component 502 can operate as means for identifying an operation request to be performed upon a memory unit.

An investigation component 504 can learn details concerning the request, commonly through use of an analysis component 106 and an evaluation component 506. A request can be evaluated by an analysis component 106 to determine what type of operation is to be performed. The analysis component 106 can function as means for analyzing the operation request to be performed upon the memory unit.

With an understanding of the operation, different data related to the operation can be obtained through a collection component 204. Obtainment of details can take place through actively soliciting sources, passive observance of information, and the like. The collection component 204 can implement as means for gathering a physical location of a requesting entity, physical location of the memory unit and contextual information (e.g., circumstance surrounding the operation, which can include time, individuals, setting, etc.) that relates to the operation request.

In order to determine if the operation is automatically allowable, the evaluation component 506 can scrutinize at least a portion of the collected data. For example, a comparison can be made as to a physical location of an owner and a location of the device. If the owner is in Italy, and the device is at the owner's home while a spouse of the user is at the home, then an inference can be made the action is likely allowable since the device is in a standard location and a presumable acceptable user is available at the standard location. Thus, the evaluation component 506 can function as means for evaluating at least a portion of the gathered information.

Based upon at least a portion of the data scrutinizing result, a resolution component 108 can determine if an operation should take place. Advanced statistical analysis can occur to process the operation, such as balancing risk of an operation against contextual necessity of the operation. Opening a presentation slide show file upon an unknown machine can be of low risk and balanced against analysis of a calendar of a user stating there is a major meeting with clients at time of a request to open. The resolution component 108 can operate as means for determining if the operation should automatically occur based upon the a result of the gathered information evaluation.

If a determination is made that the operation should take place, then an implementation component 508 can take action to move forward with executing the operation. Implementation can include notifying components that operation should move forward, instruction components how to operate, removing a block command, and the like. The implementation component 508 can function as means for automatically implementing the operation if it is determined that the operation should automatically occur.

According to one embodiment, if it is determined that an operation should not automatically take place, then the operation can be automatically denied. A security component 302 can stop the operation, such as deleting the request, information other components to ignore the request, etc. The security component 302 can operate as means for automatically implementing the operation if it is determined that the operation should automatically occur.

However, there can be more engagement with regard to determining if an operation should be ultimately allowed—e.g., allowed after an initial automatic rejection. A notification component 304 can find information regarding the operation, such as asking an owner if the operation should occur. The notification component 304 can function as means for appealing to a regulatory entity that an instruction be provided on if the operation should occur if it is determined that the operation should not automatically occur. The collection component 204 can obtain a response from the regulatory entity and a verification component 306 can determine if the entity and/or response is proper. For example, the verification component 306 can retain a list of authorized entities predefined by a device owner. The verification component 306 can implement as means for authenticating the regulatory entity.

The response and outcome can be evaluated by a decision component 510 to determine if the operation should be allowed. For instance, an entity can provide a definite answer; however, artificial intelligence techniques can be used to process ambiguous responses (e.g., lack of response, indefinite response such as an entity responding 'maybe', a response distorted by communication interference, and so forth.) The decision component 510 can function as means for allowing the operation if the regulatory entity responds to the appeal suggesting that the operation should occur and the regulatory entity is properly authenticated. The security component 302 can deny the operation if the decision component 510 is not satisfied with a result of the response and/or source. Therefore, the security component 302 can implement as means for denying the operation if the regulatory entity responds to the appeal suggesting that the operation should not occur or if the regulatory entity is not properly authenticated.

Figure 6:
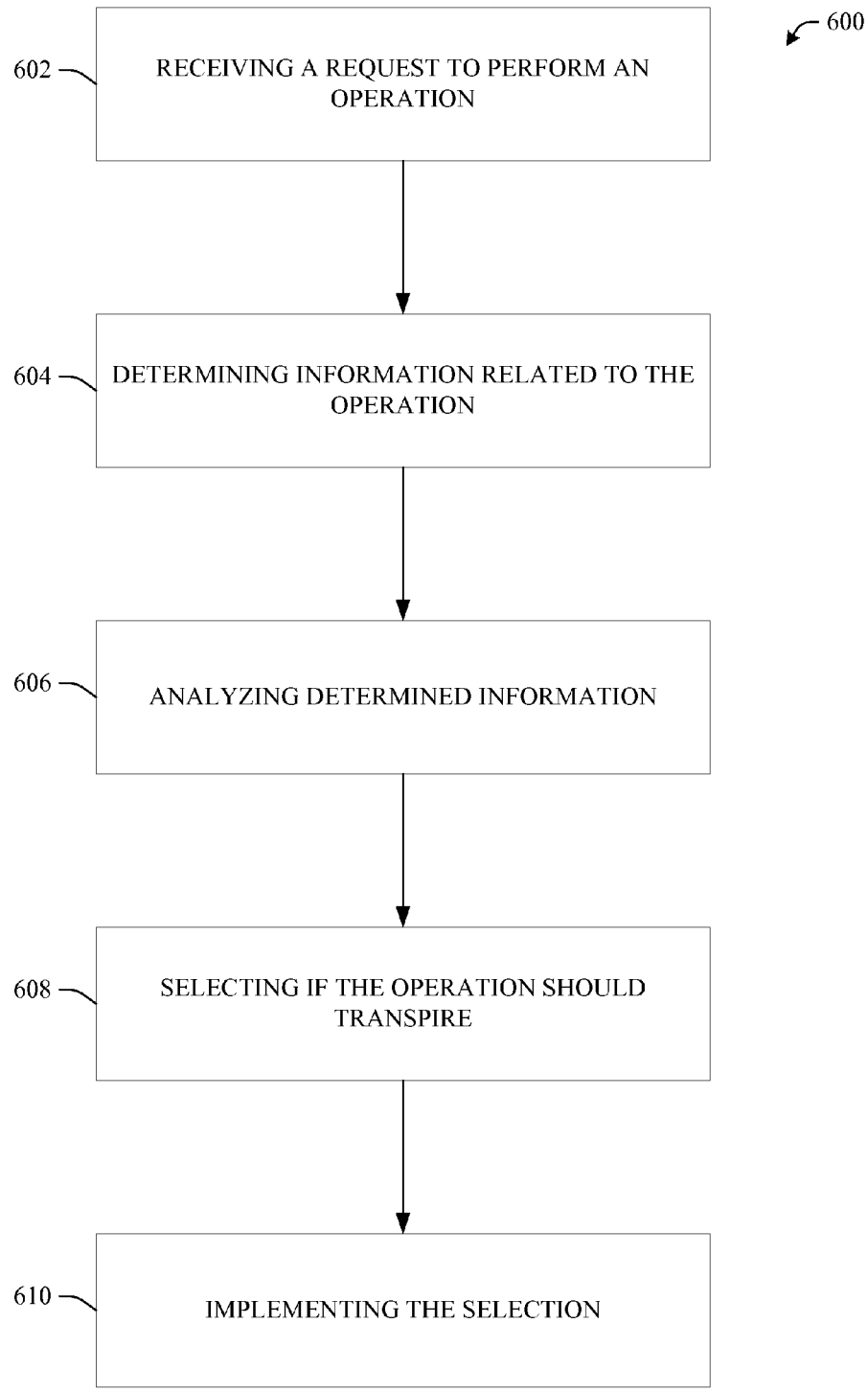
FIG. 6 illustrates a representative memory operation request processing methodology in accordance with an aspect of the subject specification.

Now referring to FIG. 6, an example methodology 600 is disclosed for selecting if an operation upon a memory device should be implemented. A request to perform an operation can be obtained at action 602, thus representing obtaining a request to perform the operation. A request can be initially received and analyzed to determine a type of operation that is to be performed. An operation can be classified based upon risk, where the classification can be used to determine a level of scrutiny in selecting if an operation should take place. For example, coupling to an auxiliary unit can be considered a low risk operation since little-to-no date is transferred while reading a file can be considered high risk.

A determination can be made as to information that is related to the operation at event 604. Determining information can include performing independent analysis, soliciting sources for data, making passive observations, and the like. Event 604 can include determining a physical location of a user—e.g., through explicit request to the user, physical location of a memory device—e.g., through use of a global positioning system, and historical use of the memory device—e.g., through a retained profile. Other information can be determined, such as a time an operation request is collected, ware rate on the portable device, and the like.

The determined information can be analyzed at act 606. Act 606 can be an example of analyzing the request and the determined physical location of a user, physical location of a storage device, and historical use of the storage device, selection on if an operation should transpire is based upon a result of the analysis. Example analysis techniques can include using rules, artificial intelligence techniques, algorithms, other techniques disclosed herein, and the like.

A selection can be made if the operation should transpire at event 608. Event 608 can implement as selecting if an operation should transpire concerning the memory device as a function of the determined physical location of the user and the device and historical use. Other information can be used in the selection—for instance, if the device has been used a relatively large number of times and is nearing a ware failure, higher scrutiny can be used to select if an operation should transpire. Selection can determine if there should be automatic transpiring, transpiring after certain data is collected, and the like. At block 610, the selection can be implemented accordingly.

Figure 7:
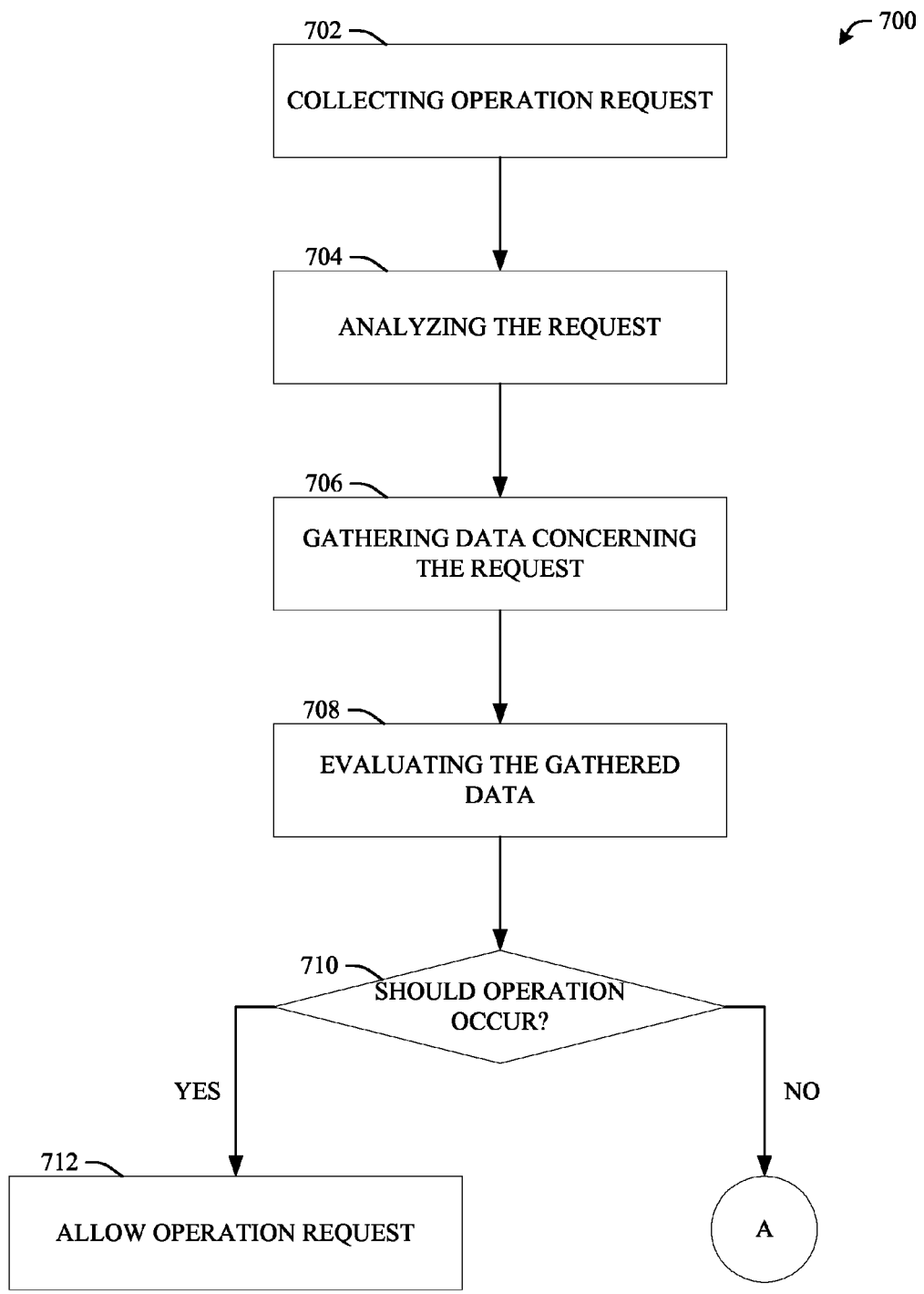
FIG. 7 illustrates a representative methodology for determining if an operation request related to a memory unit should be allowed in accordance with an aspect of the subject specification.

Now referring to FIG. 7, an example methodology 700 is disclosed for determining if an operation upon a movable storage unit should be automatically allowed. At block 702, a request to perform an operation upon a memory device can be collected in addition to metadata related to the request, such as a time a request is sent. Collection of the request can be consistent with action 602 of FIG. 2 as well as other aspects disclosed in the subject specification.

The collected request can be analyzed at action 704. Checks can be performed upon the request, such as determining a party that made the request, a time when the request is made, specific functions that should take place to meet the request, and the like. In addition to analysis, processing can take place concerning the request, such as comparing a request sent time against a request received time to infer if there is a delay that could cause a suspicion of impropriety.

Data that relates to the gathered request can be collected through action 706. Since virtually endless information can be gathered, it is to be appreciated that intelligent collection can occur. For example, certain pieces of information can be collected or data can be gathered for a set period as to not consume a large abundance of resources.

An evaluation can take place of the gathered data at act 708. The evaluation can be consistent with aspects disclosed herein. A check 710 can occur to determine if the requested operation should automatically occur. If it is determined that the operation should automatically occur, then the operation can be allowed at action 712. Allowance can include implementing the action, instructing a device that the operation should occur, and the like.

Figure 8:
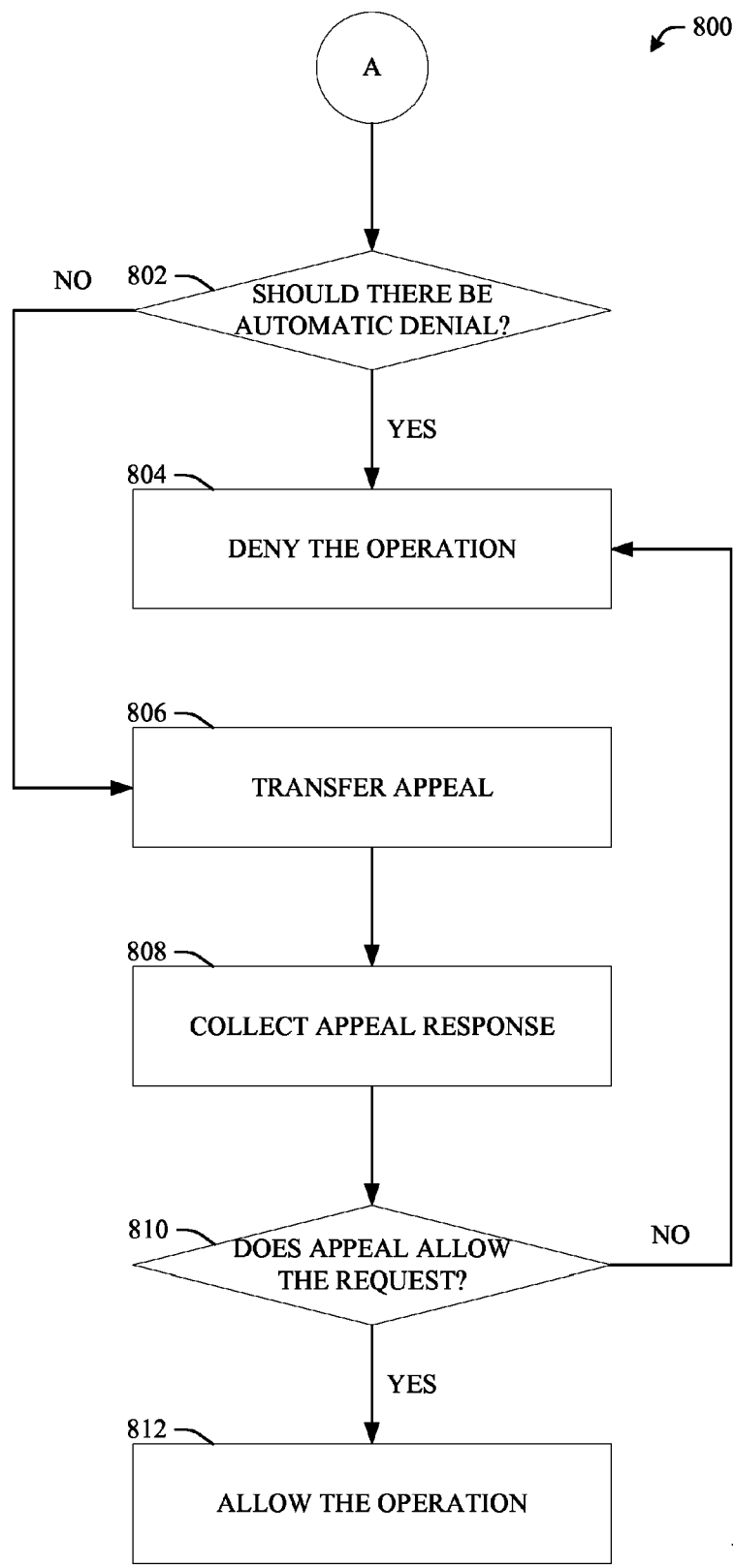
FIG. 8 illustrates a representative methodology for determining if an operation request should be denied in accordance with an aspect of the subject specification.

Now referring to FIG. 8, an example methodology 800 is disclosed for processing an operation request that is determined to not be automatically allowable. According to one configuration, the methodology 800 can be a continuation of the methodology 700 of FIG. 7 for when the check 710 of FIG. 7 determines that the request should not be automatically allowed. A check 802 can occur to determine if there should be an automatic denial.

If there should be automatic denial, then the operation can be denied at event 804. The check 802 can determine that more information should be gathered regarding deciding if the operation should occur and an appeal can be transferred soliciting more information at act 806. Another entity can respond to the appeal and the response can then be collected at action 808. A check 810 can take place to determine if the response allows the appeal. If it is determined that the appeal does not allow the request, then the methodology 800 can return to event 804 to deny the request. However, if the appeal does permit the request, then the operation can be allowed at act 812.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 9:
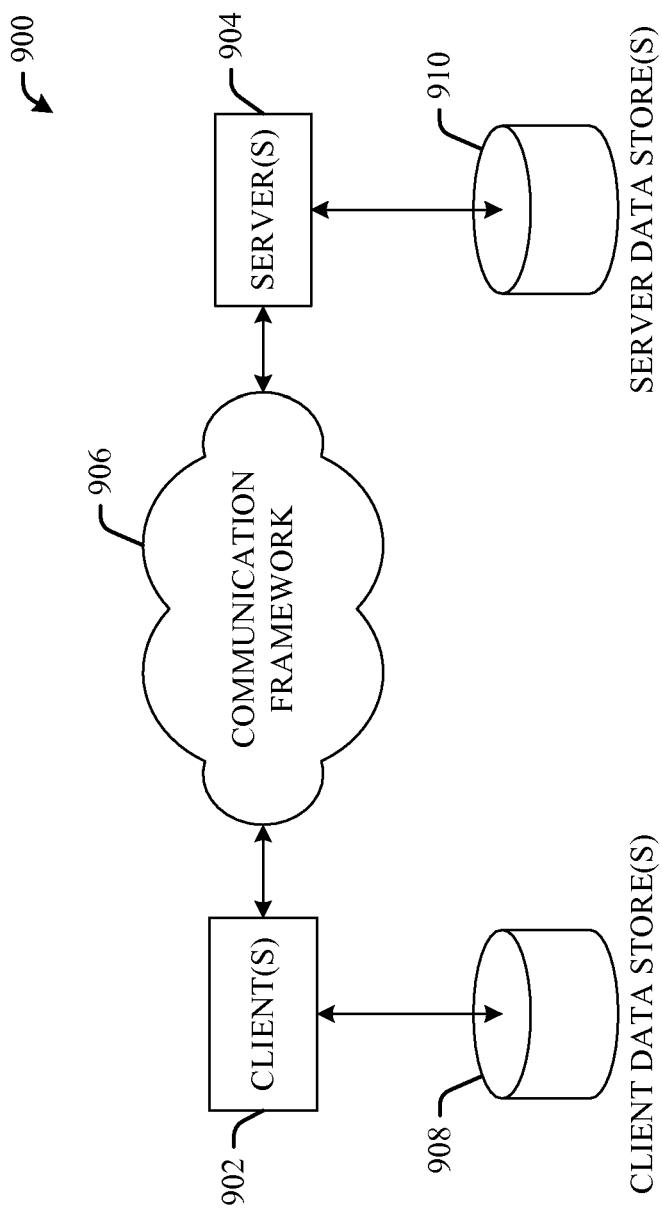
FIG. 9 illustrates an example of a schematic block diagram of a computing environment in accordance with an aspect subject specification.
Figure 10:
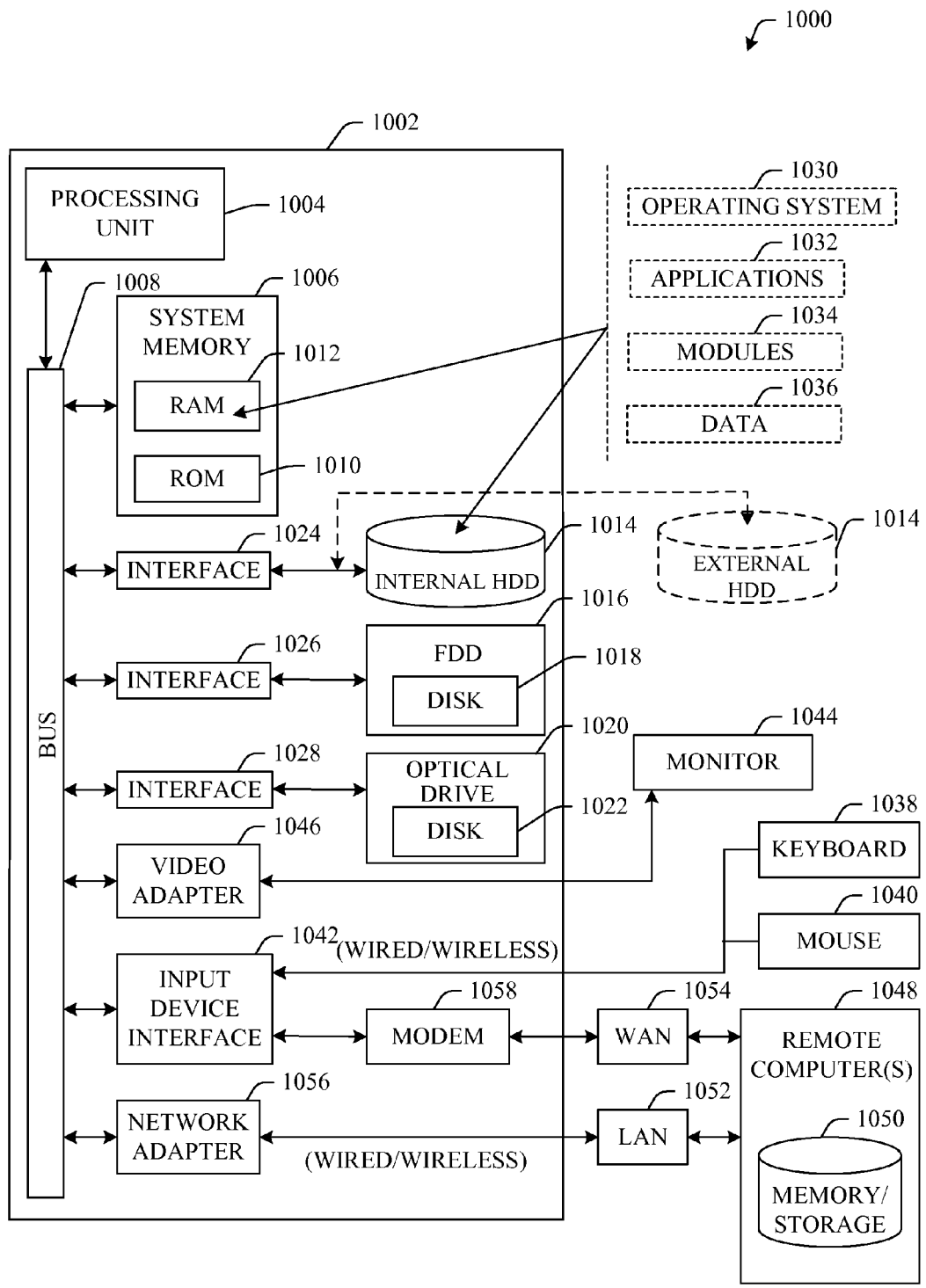
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors or proprietary specific configured processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various proprietary or commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for establishing if an operation requested for performance upon a memory device should occur, comprising:
   a communication component that gathers a request to perform the operation upon the memory device;
   a collection component that obtains metadata that relates to the operation;
   an analysis component that evaluates at least a portion of the obtained metadata that relates to the operation requested for performance upon the memory device;
   a resolution component that intelligently establishes if the operation should automatically occur;
   a security component that facilitates the resolution component to establish if the operation should automatically occur as a function of security and, if it is established that the operations should not automatically occur, denies the operation; and a notification component that emits a notice to an entity that the operation should not automatically occur responsive to establishing that the operations should not automatically occur.

2. The system of claim 1, the analysis component and the resolution component reside upon the memory device.

3. The system of claim 2, the memory device is self-contained.

4. The system of claim 1, the metadata is environmental information, contextual information, historical information, temporal information, or a combination thereof.

5. The system of claim 1, the operation requested to be performed is coupling the memory device to a supplemental device, accessing data upon the memory device, or overriding data retained upon the memory device.

6. The system of claim 1, further comprising an artificial intelligence component that makes at least one inference or at least one determination with regard to metadata evaluation or intelligent establishment if the operation should automatically occur.

7. The system of claim 1, further comprising an interaction component that requests confirmation on if the operation should occur when it is established that the operations should not automatically occur and processes a response to the request, the response allows the operation, denies the request, or makes a petition for more information.

8. The system of claim 7, further comprising a verification component that authenticates a source of the response.

9. The system of claim 1, further comprising a decision component that concludes if newly gathered information should be used to update the retained history, the retained history is updated based upon the newly gathered information with a positive conclusion and the newly gathered information is disregarded with a negative conclusion.

10. The system of claim 1, further comprising a narration component that retains a history of operation for the memory device, the history being used to determine if the operation should automatically occur.

11. The system of claim 1, further comprising a modernization component that updates the retained history as new information is gathered.

12. A method performed by a processor executing computer-readable instructions stored on a computer storage media, the method comprising
    determining a physical location of a user, a physical location of a storage device, and a historical use of the storage device, the historical use of the storage device including a log on the storage device that records one or more authorized parties who have conducted operations to the storage device; and
    selecting if an operation should transpire concerning the storage device as a function of the determined physical location of the user and the determined physical location of the storage device and the historical use of the storage device.

13. The method of claim 12, further comprising obtaining a request to perform the operation.

14. The method of claim 13, further comprising implementing the selection.

15. The method of claim 14, further comprising analyzing the request and the determined physical location of a user, physical location of a storage device, and historical use of the storage device, selection is based upon a result of the analysis.

16. The method of claim 12, wherein the determining the physical location of the user comprises determining the physical location of the user through a request to the user.

17. The method of claim 12, wherein the determining the physical location of the storage device comprises using a global positioning system.

18. A system, comprising:
    means for identifying an operation request to be performed upon a memory unit;
    means for analyzing the operation request to be performed upon the memory unit; and
    means for gathering a physical location of a requesting entity, physical location of the memory unit and contextual information that relates to the operation request;
    means for evaluating at least a portion of the gathered information;
    means for determining if the operation should automatically occur based upon a result of the gathered information evaluation;
    means for automatically denying the operation if it is determined that the operation should not automatically occur; and
    means for appealing to a regulatory entity that an instruction be provided on if the operation should occur if it is determined that the operation should not automatically occur.

19. The apparatus of claim 18, further comprising:
    means for authenticating the regulatory entity;
    means for allowing the operation if the regulatory entity responds to the appeal suggesting that the operation should occur and the regulatory entity is properly authenticated;
    means for denying the operation if the regulatory entity responds to the appeal suggesting that the operation should not occur or if the regulatory entity is not properly authenticated; and
    means for automatically implementing the operation if it is determined that the operation should automatically occur.

* * * * *